July 15, 1941.     O. B. WELKER     2,249,510
METHOD OF MAKING RESILIENT ARTICLES
Filed May 6, 1940
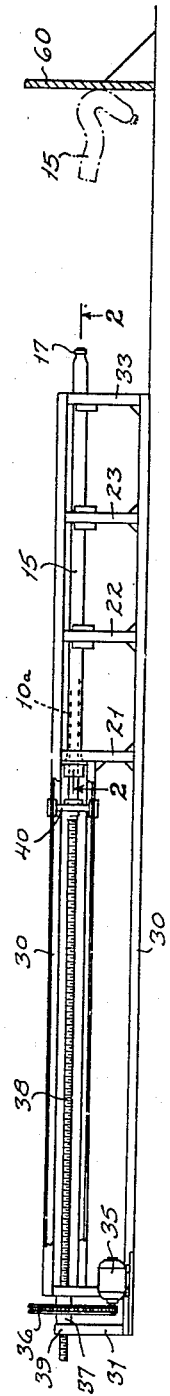
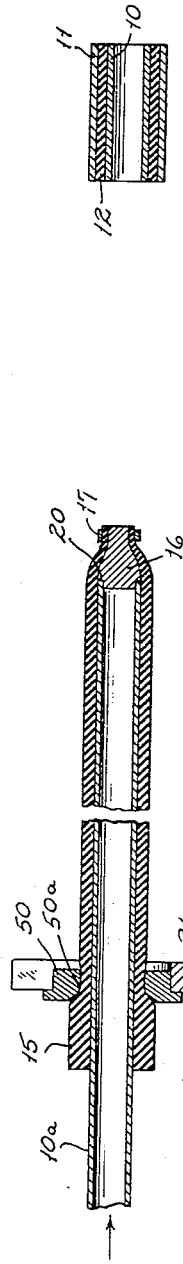
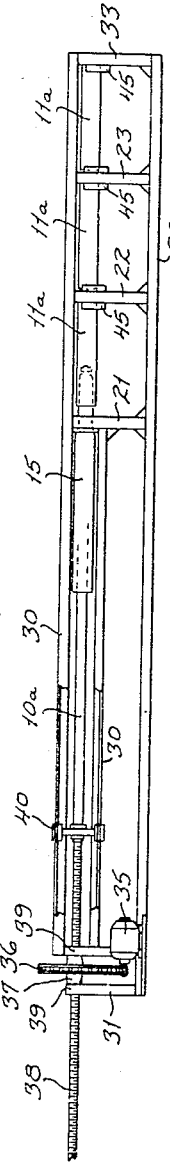
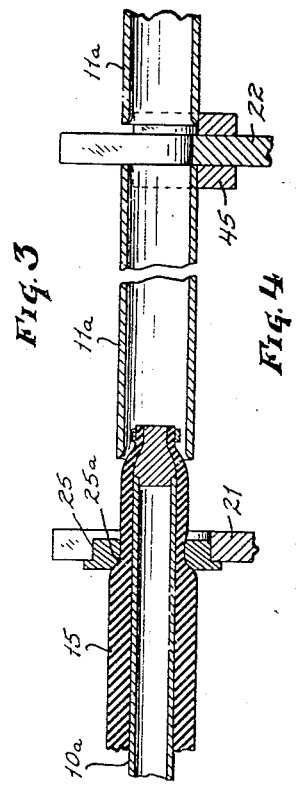
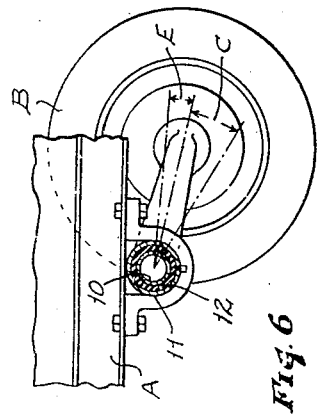
INVENTOR.
OSCAR B. WELKER
BY Bates, Teare, & McBean
ATTORNEYS Patented July 15, 1941

2,249,510

UNITED STATES PATENT OFFICE 2,249,510

METHOD OF MAKING RESILIENT ARTICLES

Oscar B. Welker, Cromwell, Conn., assignor to Albert R. Teare, Cleveland, Ohio, as trustee Application May 6, 1940, Serial No. 333,470

13 Claims. (Cl. 18—59)

This invention relates to improvements in resilient connections which embody inner and outer rigid members and an intermediate layer of rubber or other elastic material. The invention is especially concerned with the provision of an article having improved structural characteristics which will extend the life of the article, and at the same time enlarge the scope of its possibilities for use.

A prior method of making such bushings comprises inner and outer rigid members such as metal tubes or sleeves, and an intermediate elastic member which is introduced into the outer member after the elastic member has been reduced by constriction to a substantial uniform outer diameter, by a stretching force exerted in a direction extending longitudinally of the member whereby the intermediate member is confined under tension when released between the walls of the rigid members. Such connectors, or bushings are so constructed that the stresses on the elastic member are distributed uniformly throughout the length thereof. Such bushings have been advantageously used in many commercial applications and have met with great success, as they have been found to be superior to the resilient bushings or connections which were used prior to the inventions of my prior patents.

Bushings of this type have been commercially used as torsion springs or bushings, as for instance, as bushings between wheel supporting arms and their supporting spindles on automotive vehicles. In such applications, the elastic member of the bushing is generally subjected to an initial or static load, which partially rotates the outer rigid member relative to the inner member. The vibration of the load or vertical movement of the wheel axle tends to subject the bushing to repeated cycles of oscillations causing relative rotary oscillations between the inner and outer members. It has been found that these oscillations produce a condition in the rubber which is termed creepage, and that the creepage increases in amount as the oscillations increase in number. As applied to a bushing used to support the wheel arm of an automotive vehicle, the creepage results in sagging of the vehicle.

The set or creepage above mentioned limited the uses to which such torsional bushings could be used, and has also limited the life of the bushings. In the past, considerable attention and effort has been made to overcome this set or creepage. For instance, various compounds and vulcanization processes have been used by the manufacturer of the elastic member, but efforts in this direction have been limited, because it has been found that when the creepage has been reduced to a limited amount by such efforts, any further reduction also limits the flexing life of the elastic material. Limitation of the flexing life more than offsets any material reduction in the creepage obtained by such methods.

It is an object of the present invention to provide a connection of the type set forth together with an improved method of manufacturing such a connection which will overcome the disadvantage above set forth, especially by reducing the amount of creepage in the structure or elastic material without affecting its elastic life, and without detracting from the advantages and beneficial results accomplished by the use of the inventions as set forth in my patent heretofore mentioned.

Referring now to the drawing, Fig. 1 is a side elevation of a machine for making the torsional bushings in accord with the present invention and illustrates one step in the manufacture of the improved bushing; Fig. 2 is a generally vertical section on an enlarged scale taken in a plane extending at right angles to that indicated by the lines 2—2 in Fig. 1; Fig. 3 is a side elevation similar to Fig. 1, but illustrating another step in the preferred method of making the improved bushing; Fig. 4 is a section similar to Fig. 2 illustrating the step shown in Fig. 3; Fig. 5 is an axial section taken through a resilient bushing or connection made in accord with the present invention; Fig. 6 is a diagrammatic illustration of an application of this type of bushing, the bushing itself being illustrated in a transverse radial section.

In Figs. 5 and 6, the resilient connection with which the present invention is concerned is shown as comprising an inner member 10, an outer member 11, and an intermediate elastic member 12, all of which are shown as being cylindrical in shape and as having a common axis. The inner and outer members are preferably made of metal, while the intermediate member is made of elastic material such as rubber. It is understood that the inner member may be either tubular, a solid shaft of cylindrical shape, or even a polygon. The present application is concerned with the article and the improved method of making the same as hereinafter set forth in detail.

The preferred manner of carrying out my invention includes the formation of rubber stock into a long tube, the body of which is indicated at 15. One end of the tube is closed and the opposite end of the tube is open. The end of the tube is closed, as shown in Figs. 2 and 4, by a rigid part 16, the outer end of which is reduced in diameter to provide a neck which is closely embraced by the stock. A ring 17 encircles the stock at the reduced neck and cooperates with the member 16 to impart strength to the stock at the closed end so as to enable it to withstand the stresses incident to a stretching operation. The inner diameter of the body of the stock is substantially equal to the outer diameter of the inner shell 10, while the outer diameter of the stock is much larger than the inner diameter of the shell 11. Consequently, it is necessary to reduce the wall thickness of the stock, and I accomplish this by stretching the stock during the assembling operation. The method by which the elastic sleeve is inserted between the inner and outer member comprises the inserting of a long continuous tube 10a into the stock, until the forward end of the tube engages an annular shoulder 20 at the inner end of the member 16. The assembled unit is then placed in a machine and moved in an axial direction through a forming die 25, which partially reduces the diameter of the rubber stock. From such die the unit is passed into the tube 11a, which further reduces the stock to the finished diameter. The tube 11a when removed from the machine becomes the outer member 11 of the finished resilient connection.

The machine which I have shown for stretching the rubber during the inserting operation may comprise an open frame having sides 30 and ends 31 and 33 respectively. Between the ends there is a cross member 21 which supports the die 25, and there are other cross members 22 and 23, each of which supports one end of a tube 11a. In the illustration shown, the end member 33 functions likewise as a support for one of the tubes 11a. While I have illustrated the machine as supporting three tubes in tandem relationship, it is understood that the machine is capable of use with any number of tubes and that it may be designed for tubes of any length.

To force the stock into the outer member, I have shown an electrical motor 35 which through a driving chain 36 rotates a gear, the hub of which is shown at 37. The hub of such gear is threaded for engagement with a threaded spindle 38 and is splined to a suitable key, the bearings 39 of which are carried by the frame of the machine and guide the spindle. The axis of the threaded spindle is coextensive with that of the tube 10 and with those of the tubes 11a, and its inner end is secured to a carriage 40 which is arranged to receive one end of the tube 10a.

This apparatus is used as follows: The tube 10a is inserted into the rubber stock until it engages the end thereof, whereupon the projecting end of the tube is placed on the carriage 40. At this time the neck of the stock is disposed between the carriage and the die 25. The motor is then started, whereupon the operator guides the forward end of the stock into the die. He then places one end of a tube 11a in a saddle 45 on a cross member 22 and manually guides the other end to receive the moving unit as it is passed through the die. Position of the parts at such time is represented in Fig. 4. As soon as the stock is in such tube, the operator is free to place another tube in the saddle 45 on the next cross member 23, and guide it in the same manner to receive the forwardly moving stock. The same operation is repeated until all of the tubes for which the machine has been designed have been assembled. It is understood that the length of the tube and the length of the rubber stock is such that at the completion of the operation, the reduced neck projects beyond the far-most end of the last outer tube. Thereupon, the unitary structure, which comprises the tube 10a, the stretched rubber stock and a plurality of tubes 11a, is lifted from the machine and the motor is operated to return the carriage to its initial position. The assembled unit is then cut into separate sections, each having the length of the outer tube 11a so that the finished product corresponds to that shown in Fig. 5. If desired, however, the outer tube may comprise an elongated member from which sections may be cut transversely. This method of assembling the stock on the tubes is described and claimed in my prior patents heretofore referred to.

In Fig. 6, I have diagrammatically illustrated a bushing in use as a torsion bushing interposed between a frame A and a wheel B of the general type used in automotive vehicles. The application of the static load of the vehicle on the assembly causes angular movement of the inner tube 10 relatively to the outer shell 11, as indicated by the angle C. Following repeated oscillations of the inner tube 10 due to movement of the wheel relatively to the vehicle, the static load moves the inner tube a greater distance than before the oscillations took place, as indicated by the angle E; the amount of the increase being dependent, of course, upon the period of time to which the bushing is subjected to the oscillations, for the angle increases as the time increases. This results in a settling of the frame under the dead load. The increase of the angle E over the angle C represents what is commonly called the creep of the intermediate resilient sleeve of the bushing.

As heretofore mentioned, the various rubber and elastic compositions used in the manufacture of such intermediate sleeves have been compounded to produce or provide a material in which the creep has been reduced as much as possible without sacrificing the flexibility and flexing life of the material. Despite such reductions, a considerable amount of creep remains in the rubber or elastic compound. This, as heretofore mentioned, limits the types of applications to which such bushings may be put and defines a limit to the static and oscillatory loads with which the bushings may be used.

The method by which the bushing is manufactured according to the present invention, appreciably limits the amount of creep of the rubber, and with many elastic compounds, eliminates creepage entirely so far as practical purposes are concerned. Creep in such elastic compounds is believed to be caused by the particular molecular structure of the rubber or elastic material. In the case of rubber, it is believed that the carbon atoms of the rubber molecule lay in zigzag linkages of various lengths which straighten out when stretched, and the creep in the rubber is believed to be caused by a slipping of the molecules one on the other. By controlling the material in vulcanization processes, as has been done in the past, the resistance to the slippage of the molecules has been somewhat decreased, but the extent of such decrease is insufficient for many uses. I have found that if the rubber or similar elastic material is stretched from 50% to 200% of its own length, and then released, prior to its insertion in the outer sleeve 11, the permanent set or creepage in the rubber or elastic is materially reduced, and with some rubber or elastic compounds, this creepage is entirely eliminated so far as practical purposes are concerned. In accord with the present invention therefore, I stretch the rubber or other elastic material from 50% to 200% of its normal length and I then release the material from the stretching forces and permit it to contract. Thereupon, I re-stretch the elastic material for insertion in the outer tubes as heretofore described.

For pre-stretching of the rubber I prefer to use substantially the same apparatus heretofore described in connection with the insertion of the rubber, or elastic material in the outer tube 11a. The method which I use comprises the insertion of the tube 10a into the stock until the forward end of the tube engages the annular shoulder 20 at the inner end of the plug 16, as shown in Fig. 2. The assembled unit is then placed in the machine heretofore described, and the motor 35 is operated to move the carriage 40 forwardly forcing the rubber through a stretching die 50. This die is provided with an opening 50a of the same size or slightly smaller than the opening 25a in the die 25, which is to be used to stretch the elastic material for insertion in the outer tube 11, as heretofore described. The carriage 40 is then moved forwardly to force the tube 10 and elastic sleeve 15 through the die 50 to stretch the elastic material as illustrated in Fig. 1. The elastic material is passed through the die 50 without restricting the external surface of the material other than that caused by the die. The carriage is brought forwardly until the entire length of the rubber or elastic material passes through the die, at which time it is allowed to contract to substantially its original length and diameter. If desired, a protecting buttress 60 may be placed adjacent the end of the machine as shown in Fig. 1 to stop the tube as it is shot from the end of the member 10a.

With some elastic compounds, I find that a single prestretching operation is sufficient to materially reduce or eliminate the creep, but that if desired, two or more prestretching operations may be employed. Thereafter, the tube 10a is re-inserted into the stock and the stock is re-stretched and inserted in the outer tubes 11a as heretofore described in connection with Figs. 3, 4 and 5. I find that this pre-stretching of the rubber reduces the permanent set of the rubber, increases its resistance to creepage or eliminates creepage for all practical purposes, and provides a high grade bushing for use as a torsional spring, shock or vibration absorber. Bushings made under such conditions permit constant and continued applications of torque without causing an appreciable increase in the torsional movement of the bushing or rubber.

While I have mentioned the use of rubber for the elastic material or intermediate layer of the bushing, I may also use synthetic rubbers. However, I prefer to use an elastic material which has a hardness of the order of from 40 to 65 durometer.

Experience has shown that by using the method of pre-stretching the elastic material as above described, a very uniform dispersion of the stresses in the material may be had, and that the uniformity of the structure may be further insured by coating the inner and outer members 10 and 11, as well as the die with a lubricant, such as soap, castor oil, glycerine, or Vaseline. However, I prefer to use Vaseline with tubes made of natural rubber. For synthetic rubbers the lubricant is made from one of the solvents of the material. After the bushings have been assembled this lubricant is absorbed by the elastic material, and after a period of time is absorbed to such an extent that the stress applied in the area of contact between the rubber and the inside member is practically equal to the stress in the body of the rubber. I find, however, that after the bushing has been assembled, it may be subjected to a heating or baking operation of from two to five hours at a temperature from 120° to 160° F., to accelerate the absorption of the lubricant used in the assembly. The bushing is then adapted for immediate use at its maximum efficiency. The heating of the bushing after assembling has another advantage in that it relieves any stresses set up in the rubber during the stretching and assembling operations, and adds greatly to the uniformity of the structure.

While I have illustrated the invention as being used in connection with a support for motor vehicle wheels, it is to be understood that it is applicable to other uses, one of which, for example, includes a typewriter platen wherein the intermediate resilient sleeve is disposed between a wooden core and an outer sleeve of flexible material.

I claim:

1. The method of forming an article having a resilient sleeve therein, comprising stretching a section of elastic stock, releasing the stretched stock, re-stretching the stock, and forcing the stretched stock between a pair of inner and outer members.

2. The method of forming an article having a resilient sleeve therein, comprising stretching a section of hollow elastic stock, releasing said stock, supporting the stock on a core, re-stretching the stock while so supported, and moving the stretched stock and core into an enclosing casing.

3. The method of forming articles having a resilient sleeve therein, comprising inserting a rigid member within a section of tubular elastic stock, stretching the stock longitudinally while so supported, releasing the stock from the stretching force, re-positioning the rigid member within the stock, re-stretching the stock, and moving the re-stretched stock and core into an enclosing casing.

4. The method of forming articles having a resilient sleeve therein, comprising inserting a rigid tubular member longitudinally within a section of tubular elastic stock having a restricted end, thereafter forcing said member and stock through a restricted aperture in a die to stretch the stock, releasing the stock from engagement with the die, thereafter forcing said member and stock through a restricted aperture in a die to again stretch the stock and reduce the diameter thereof, and then telescopically enclosing the re-stretched section of stock within a rigid enclosing casing.

5. The method of forming an article having a resilient sleeve therein comprising stretching a section of hollow elastic material to from 50% to 200% greater than its normal length, releasing the material from the stretching forces, re-stretching the material to from 50% to 200% greater than its normal length, and forcing the re-stretched material into an outer confining member.

6. The method of forming an article having a resilient sleeve therein, comprising stretching a section of hollow elastic material on a core to from 50% to 200% greater than its normal length, releasing the material from the stretching forces, re-stretching the material on a core to substantially the same extent as the first stretching, and moving the stretched material and core as a unit into an enclosing casing whereby the elastic material within the casing is held under 50% to 200% stretch.

7. The method of forming an article having a resilient sleeve therein, comprising stretching a section of hollow elastic material on a core to from 50% to 200% greater than its normal length, releasing the section from the stretching force, re-stretching the released section on a core to from 50% to 200% greater than its normal length, but less than the amount of stretch imparted to the section by the first stretching operation, and moving the re-stretched section and core as a unit into an enclosing casing.

8. The method of forming an article having a resilient sleeve therein, which includes stretching a section of tubular elastic material a plurality of times while releasing the section from the stretching forces after each stretching operation, inserting a rigid core longitudinally within the tubular stock, restretching the stock on the core, and inserting the re-stretched stock and core as a unit into an enclosing member.

9. The method of forming an article having a resilient sleeve therein which consists in freely supporting a hollow elastic stock on a core, applying force to the leading edge of the core to force the stock through a stretching die whereby the stock is placed under tension, releasing the stock from the die, again forcing the stock through a stretching die whereby the stock is again placed under tension, and forcing the re-tensioned stock into a confining member, the diameter of which is less than the diameter of the retensioned stock.

10. The method of making an article having a resilient sleeve therein, which consists in freely supporting hollow elastic stock upon a core, forcing the stock and core into a reducing, stretching and tensioning die having a diameter less than the diameter of the stock, by applying force on the leading edge of the stock and core at a rate that will stretch the stock uniformly from end to end, releasing the stock from the stretching die, again forcing the stock and core through a reducing, stretching and tensioning die having a diameter less than the diameter of the stock, and moving the stretched stock and core into a confining member.

11. The method of forming an article having a resilient sleeve therein, which consists in stretching a section of hollow elastic stock longitudinally on a core, applying a lubricant capable of being absorbed by the stock on the internal surface of a confining member, forcing the stretched stock and core into the lubricated confining member, and thereafter heating the core, stock and member as a unit to accelerate the absorption of the lubricant.

12. The method of forming an article having a resilient sleeve therein which consists in applying to the inner and outer surfaces of a section of stretched elastic stock a lubricant capable of being absorbed by the stock, freely supporting the lubricated stock on a core, applying a force to the leading edge of the core to force the stock through a stretching die, releasing the stock from the stretching forces, restretching the stock by again applying a force to the leading edge of the core to force the stock through a reducing, stretching and tensioning die, lubricating the internal surface of a confining member, the diameter of which is less than the diameter of the tensioned stock, forcing the tensioned stock and core into the confining member while maintaining the tension on the stock, releasing the tension on the now confined stock, and finally subjecting the stock to a temperature of from 120 degrees F., to 160 degrees F., to thereby accelerate the absorption of the lubricants.

13. The method of forming an article having a resilient sleeve therein, which consists in stretching a section of elastic stock to from 50% to 200% greater than its normal length, releasing the stock, re-stretching the stock while supporting it on a rigid core to from 50% to 200% greater than its normal length, forcing the re-stretched stock and core into a confining casing while retaining the stock stretched, and finally heating the stock, core and casing as a unit.

OSCAR B. WELKER.